(12) United States Patent
Huss et al.

(10) Patent No.: US 8,340,202 B2
(45) Date of Patent: Dec. 25, 2012

(54) METHOD AND APPARATUS FOR EFFICIENT SOFT MODULATION FOR GRAY-MAPPED QAM SYMBOLS

(75) Inventors: Fredrik Huss, Sundbyberg (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 407 days.

(21) Appl. No.: 12/722,169

(22) Filed: Mar. 11, 2010

(65) Prior Publication Data

US 2011/0222618 A1 Sep. 15, 2011

(51) Int. Cl.
*H04L 5/12* (2006.01)
(52) U.S. Cl. ........ 375/261; 375/262; 375/264; 375/365; 375/341
(58) Field of Classification Search ............ 375/262, 375/261, 264, 265, 341
See application file for complete search history.

(56) References Cited

U.S. PATENT DOCUMENTS

| | | | |
|---|---|---|---|
| 6,078,626 A | 6/2000 | Ramesh | |
| 6,353,911 B1 | 3/2002 | Brink | |
| 6,661,282 B2 | 12/2003 | Ha et al. | |
| 6,834,088 B2 | 12/2004 | Agami et al. | |
| 6,904,097 B2 | 6/2005 | Agami et al. | |
| 6,907,084 B2 | 6/2005 | Jeong | |
| 6,985,536 B2 | 1/2006 | Oelcer et al. | |
| 7,000,167 B2 | 2/2006 | Coker et al. | |
| 7,076,000 B2 | 7/2006 | Rodriguez | |
| 7,139,335 B2 | 11/2006 | Kolze | |
| 7,142,610 B1 | 11/2006 | Wang | |
| 7,173,990 B2 | 2/2007 | Kim et al. | |
| 7,269,227 B2 | 9/2007 | Chiu et al. | |
| 7,313,750 B1 | 12/2007 | Feng et al. | |
| 7,315,578 B2 * | 1/2008 | Cheng | 375/261 |
| 7,480,342 B2 * | 1/2009 | Wilhelmsson et al. | 375/286 |
| 7,505,524 B2 | 3/2009 | Lozhkin | |
| 7,583,762 B2 | 9/2009 | Graef et al. | |
| 7,602,838 B2 | 10/2009 | Bottomley et al. | |
| 2002/0067777 A1 * | 6/2002 | Jeong | 375/324 |
| 2002/0131515 A1 | 9/2002 | Rodriguez | |
| 2003/0123582 A1 | 7/2003 | Kim et al. | |
| 2004/0091058 A1 | 5/2004 | Tosato et al. | |

(Continued)

FOREIGN PATENT DOCUMENTS

EP 0887976 A2 6/1998

(Continued)

OTHER PUBLICATIONS

Office Action issued May 23, 2007 for U.S. Appl. No. 10/746,434 to Cheng (now US Pat. 7135578).

(Continued)

*Primary Examiner* — David Ometz
*Assistant Examiner* — Rahel Guarino
(74) *Attorney, Agent, or Firm* — Coats & Bennett, P.L.L.C.

(57) ABSTRACT

In one aspect, the present invention greatly simplifies soft modulation calculations, in part by exploiting certain properties of Gray-mapped QAM constellations used in modulating symbols of interest. In at least one embodiment, the simplified processing includes performing the soft modulation separately for the real and imaginary parts of each symbol of interest, by using the Gray mapping to decompose each of the real and imaginary parts into binary soft modulations for each bit, and then using a computationally-efficient table lookup to calculate the binary soft modulation. Here, the look-up table comprises pre-computed bit contributions to the complex soft symbol value to be formed for the symbol of interest.

18 Claims, 5 Drawing Sheets

U.S. PATENT DOCUMENTS

| | | |
|---|---|---|
| 2005/0141628 A1 | 6/2005 | Cheng |
| 2005/0201484 A1 | 9/2005 | Wilhelmsson et al. |
| 2006/0209994 A1 | 9/2006 | Geaef et al. |
| 2008/0153449 A1 | 6/2008 | Prasad et al. |

FOREIGN PATENT DOCUMENTS

| | | |
|---|---|---|
| EP | 1195908 A2 | 4/2002 |
| EP | 1294152 A2 | 9/2002 |
| EP | 1432128 A2 | 12/2003 |
| GB | 2440584 A | 2/2008 |
| WO | 02/33919 A2 | 4/2002 |
| WO | 03/043283 A1 | 5/2003 |
| WO | 03/075528 A1 | 9/2003 |
| WO | 2005067239 A1 | 7/2005 |

OTHER PUBLICATIONS

Alhabsi, Amer H. "Spectrally Efficient Modulation and Turbo Coding for Communication Systems." Dissertation submitted to the graduate school at University of Arkansas at Little Rock, Nov. 2005.

Alvardo, A. et al. "Distribution of L-values in Gray-mapped M2-QAM Signals: Exact Expressions and Simple Approximations." IEEE Transactions on Communications, vol. 57, Issue 7, Jul. 2009, pp. 2071-2079.

Ampeliotis, D. et al. "Low Complexity Turbo Equalization for High Data Rate Wireless Communications." EURASIP Journal on Wireless Communications and Networking, vol. 2006, Article ID 25686, Jul. 2006, pp. 1-12.

Berardinelli, G. et al. "Improving SC-FDMA Performance by Turbo Equalization in UTRA LTE Uplink." IEEE Vehicular Technology Conference, 2008 (VTC Spring 2008),Singapore, May 11-14, 2008, pp. 2557-2561.

Berardinelli, G. et al. "Turbo Receivers for Single User MIMO LTE-A Uplink." Available at: http://vbn.aau.dk/fbspretrieve/19119962/VTCspring2008.pdf. Spring 2008.

Bittner, S. et al. "Iterative Correction of Clipped and Filtered Spatially Multiplexed OFDM Signals." IEEE Vehicular Technology Conference, 2008 (VTC Spring 2008), Singapore, May 20, 2008, pp. 953-957.

Gao, X. "Adaptive MIMO GMC/OFDM FDD System in Distributed Radio Network." Dec. 7, 2006, available at: http://74.125.93.132/search?q=cache:dFcxJYzAC84J:www.tnlist.org.cn/jsps/thnoki asummit06/keynote_speech/Keynote%2520Speech%25205--gao%2520xiqi--MIMO-GMC-OFDM(NCRL,SEU).pdf+Adaptive+MIMO+GMC/OFDM+FDD+System+in+Distributed+Radio+Network&cd=1&hl=en&ct=clnk&gl=us.

Pasanen, P. et al. "IST-2003-507581 Winner, D2.6 version 1.1, Assessment of Multiple Access Technologies." Information Society Technologies, Oct. 31, 2004. Available at: http://projects.celtic-initiative.org/WINNER+/DeliverableDocuments/D2.6v1.1.pdf.

Koetter, R. et al. "Turbo Equalization." IEEE Signal Processing Magazine, Jan. 2004, pp. 67-80.

Nicker, P. et al. Abstract of "Turbo Equalization Receivers for Evolved GSM/EDGE Radio Access Network using QAM Modulation." Physical Communication, vol. 1, Issue 3, Sep. 2008, pp. 229-235. Abstract downloaded from www.sciencedirect.com.

Nour, C. et al. "Improving BICM Performance of QAM Constellations for Broadcasting Applications." Symposium 2008, available at: https://portail.telecom-bretagne.eu/publi/public/download.jsp?id_publication=5900.

Pang, B. et al. "Hybrid ARQ Technique Employing a Signal Constellation Rearrangement Based on 256-QAM." Proceedings of the 2008 International Conference on Advanced Infocomm Technology, Shenzhen, China, Article No. 107, 2008.

Simoens, S. et al. "Low-Complexity Viterbi Metrics applied to Bit-Interleaved COFDM." publication date unknown, available at: http://citeseerx.ist.psu.edu/viewdoc/download;jsessionid=15CE14F2778688CB9DE4D6CAA2F6D4E4?doi=10.1.1.61.6799&rep=rep1&type=pdf, 2004.

Tripathy, A. et al. "A Low Complexity Approach to Turbo Equalizer." WSEAS Transactions on Signal Processing, Issue 5, vol. 4, May 2008, pp. 251-260.

Tuchler, M. et al. "Turbo Equalization: Principles and New Results." IEEE Transactions on Communications, vol. 50, No. 5, May 2002, pp. 754-767.

Usmani, A. "Iterative Receivers with Channel Estimation for Multi-Carrier Systems." Master Thesis submitted to Information Technology University of Ulm, Mar. 2006.

Wang, M. et al. "Soft Decision Metric Generation for QAM with Channel Estimation Error." IEEE Transactions on Communications, vol. 90, No. 7, Jul. 2002, pp. 1058-1061.

* cited by examiner

METHOD AND APPARATUS FOR EFFICIENT SOFT MODULATION FOR GRAY-MAPPED QAM SYMBOLS

TECHNICAL FIELD

The present invention generally relates to soft modulation processing, and particularly relates to a method and apparatus for efficient soft modulation for Gray-mapped QAM symbols, such as those in a communication signal received by a wireless communication node.

BACKGROUND

Turbo equalization is an iterative equalization and decoding technique that enhances performance over frequency selective channels. See, for example, G. Berardinelli, et al., "Improving SC-FDMA Performance by Turbo Equalization in UTRA LTE Uplink", IEEE VTC Spring 2008, and R. Koetter, et al., "Turbo Equalization", IEEE Signal Processing Magazine, Volume 21, Issue 1, January 2004.

Compared to linear receivers where the equalization and decoding is done separately, Turbo equalization allows joint equalization and decoding by utilizing the result after tentative decoding to improve equalization by subtracting inter-symbol interference. For MIMO transmission, a similar technique known as Turbo soft interference cancellation (Turbo SIC) can be used to improve equalization by subtracting inter-stream interference. See, for example, G. Berardinelli, et al., "Turbo Receivers for Single User MIMO LTE-A Uplink", IEEE VTC Spring 2009.

In Turbo equalization and/or soft interference cancellation, an iterative loop is used over the equalization, decoding and signal regeneration. In the soft modulation step, regenerated symbol values are calculated for each symbol as $$\hat{s}_n = E\{s_n\} = \sum_{i=0}^{M-1} s^i P(s_n = s^i),$$

where $s^i$ is the transmitted symbol constellation for $i=0, \ldots, M-1$. Here, the input to the soft modulation is the probabilities for each bit after decoding. Thus the symbol probability equals the product of the corresponding bit probabilities, which gives $$\hat{s}_n = \sum_{i=0}^{M-1} s^i P(s_n = s^i) = \sum_{i=0}^{M-1} \left( s^i \prod_{k=0}^{q-1} P(b_{n,k} = b_k^i) \right),$$

where $q=\log_2 M$ is the number of bits per symbol.

With the above expression, the soft modulation step has a high computational complexity. For example, with 16-QAM modulation each soft modulated symbol requires calculating 16 probabilities and multiplying them with the corresponding constellation point and taking the sum of these products. Such computations contribute significantly to the total receiver complexity.

SUMMARY

In one aspect, the present invention greatly simplifies soft modulation calculations, in part by exploiting certain properties of Gray-mapped QAM constellations used in modulating symbols of interest. In at least one embodiment, the simplified processing includes performing the soft modulation separately for the real and imaginary parts of each symbol of interest, by using the Gray mapping to decompose each of the real and imaginary parts into binary soft modulations for each bit, and then using a computationally-efficient table lookup to calculate the binary soft modulation value. Here, the look-up table comprises pre-computed bit contributions to the complex soft symbol value to be formed for the symbol of interest.

Thus, in one or more embodiments, the present invention provides a method of generating a complex soft symbol value for a symbol of interest having a Gray-mapped QAM format, the complex soft symbol value having a real part and an imaginary part. The method includes storing a look-up table of pre-computed bit contributions to the complex soft symbol value. (That is, the look-up table includes pre-computed bit contributions that are accessed according to the input bit soft values determined for a given symbol of interest, to form a complex soft symbol value for that symbol of interest, based on drawing the appropriate bit contributions from the look-up table.)

The method further includes generating input bit soft values for the symbol of interest, each input bit soft value being a likelihood estimate for a given bit in the symbol of interest, and calculating the complex soft symbol value for the symbol of interest. The calculation includes determining a first soft symbol value for the real part of the symbol of interest by indexing into the look-up table as a function of the input bit soft values corresponding to the real part, and determining a second soft symbol value for the imaginary part of the symbol of interest by indexing into the look-up table as a function of the input bit soft values corresponding to the imaginary part. Further, the method includes forming the complex soft symbol value for the symbol of interest by combining the first and second soft symbol values.

In the same or other embodiments, the present invention provides an apparatus configured to generate a complex soft symbol value for a symbol of interest having a Gray-mapped QAM format, the complex soft symbol value having a real part and an imaginary part. The apparatus includes memory configured to store a look-up table of pre-computed bit contributions to the complex soft symbol value, and equalization and decoding circuitry.

The equalization and decoding circuitry—e.g., a demodulator, decoder, and soft modulation circuit—is configured to generate input bit soft values for the symbol of interest, each input bit soft value being a likelihood estimate for a given bit in the symbol of interest, and to calculate the complex soft symbol value for the symbol of interest. The equalization and decoding circuitry, which may be a programmed microprocessor, digital signal processor, or other logic circuit, is configured to determine a first soft symbol value for the real part of the symbol of interest by indexing into the look-up table as a function of the input bit soft values corresponding to the real part, and determine a second soft symbol value for the imaginary part of the symbol of interest by indexing into the look-up table as a function of the input bit soft values corresponding to the imaginary part. The circuitry is further configured to form the complex soft symbol value for the symbol of interest by combining the first and second soft symbol values.

With the above in mind, in at least one embodiment, the apparatus is a wireless communication apparatus, e.g., a wireless communication network node, such as a WCDMA NodeB or LTE eNodeB. The apparatus in one or more embodiments includes a multiple-input-multiple-output (MIMO) receiver for receiving and decoding data and/or control signaling from a MIMO signal. The apparatus advantageously uses the above-described processing to form complex soft symbol values for received symbols of interest in the MIMO signal, and uses the complex soft symbol values as part of a soft modulation process, for reducing interference in the received MIMO signal.

Of course, the present invention is not limited by the above features and advantages. Indeed, those skilled in the art will recognize additional features and advantages upon reading the following detailed description, and upon viewing the accompanying drawings.

DETAILED DESCRIPTION

Figure 1:
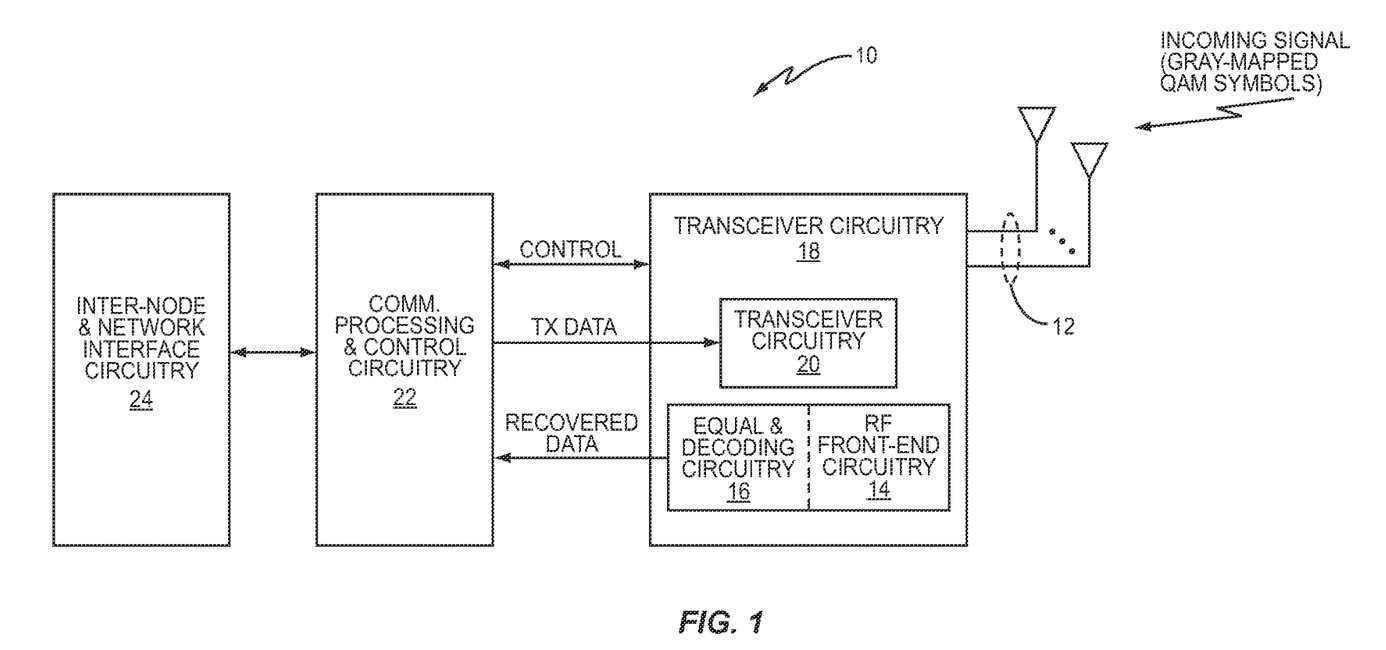
FIG. 1 is a block diagram of one embodiment of an apparatus configured to implement a computationally efficient method of generating complex soft symbol values—soft modulation values—for received symbols of interest, for use in interference suppression, for example.

FIG. 1 illustrates one embodiment of an apparatus 10 that is configured to generate a complex soft symbol value for a symbol of interest having a Gray-mapped QAM format, the complex soft symbol value having a real part and an imaginary part. The illustrated embodiment is based on the non-limiting example assumption that the apparatus 10 is implemented as a node in a wireless communication network. For example, the apparatus 10 comprises a NodeB configured for use in a WCDMA network, an eNodeB configured for use in an LTE or LTE Advanced network, or another type of network transceiver node or base station.

With this non-limiting example in mind, the apparatus 10 includes one or more antennas 12, RF receiver front-end circuitry 14 and associated equalization and decoding circuitry 16, which are included in transceiver circuitry 18. The depicted transceiver circuitry 18 further includes transmitter circuitry 20, and it is associated with communication and processing control circuitry 22, which in turn may be associated with inter-node and network interface circuitry 24. The interface circuitry 24 provides, for example, communication between like apparatuses 10 within the wireless communication network and/or provides for control and traffic signaling between the apparatus 10 and one or more "core network" nodes, which are not depicted.

Those skilled in the art will appreciate that at least a portion of the apparatus circuitry may comprise one or more digital signal processors, microprocessors, or other types of digital processing circuits (e.g., FPGAs, ASICS, or other logic circuits). Those skilled in the art will further appreciate that at least some of the relevant communication signal processing described herein is implemented in one or more embodiments using one or more such digital processors, which are configured or otherwise specially adapted as particularized signal processing circuits according to the execution of stored computer program instructions. That is, the execution of stored computer program instructions that implement some or all of the method functions disclosed herein result in digital processing circuits that are specially adapted according to the teachings herein.

With the above in mind, in a particular embodiment, the one or more antennas 12 comprise at least two antennas 12, for receiving a transmitted multiple-input-multiple-output (MIMO) signal, and the apparatus 10 operates at least in part as a MIMO receiver for processing—e.g., demodulating and decoding—a received MIMO signal or signals. For example, in the NodeB/eNodeB or other base station context, the transceiver circuitry 18 may comprise statically or dynamically organized pools of radio circuits and associated digital signal processing and control circuits. These communication resources are operated in accordance with the involved communication standards or protocols, to support multiple logical and/or physical control and data channels on a downlink, for transmitting to any number of mobile terminals or other items of user equipment (UE). Likewise, the transceiver circuitry 18 (and any supporting processing or control circuitry 22) may be configured to receive and process any number of uplink signals from such terminals or other UEs.

The receiver front-end circuitry 14 therefore includes filtering, amplification, and down-conversion circuits, as needed, to generate one or more digital sample streams corresponding to antenna-received signals, and the equalization and decoding circuitry 16 processes the digital sample stream(s), to obtain data and/or control signaling transmitted by a transmitter, such as a mobile terminal in a cellular communication network based on the Long Term Evolution (LTE) standards. Again, those skilled in the art will appreciate that all such circuitry may be organized to support the reception and processing of multiple such signals and/or multiple channels, and that the soft modulation processing that is of particular interest herein may be performed for more than one signal of interest, e.g., in parallel, for multiple signals being received by the apparatus 10.

In turn, the communication processing and control circuitry 22 uses, processes, or otherwise responds to the information bits recovered from the received signal(s) by the equalization and decoding circuitry 16. In this regard, the equalization and decoding circuitry 16 in one or more embodiments is configured to implement a soft modulation process, where it generates complex soft symbol values for received symbols of interest, for use in reducing interference in any given received signal that is of interest. For example, in FIG. 2 the apparatus 10 comprises a memory 30 configured to store a look-up table 32 of pre-computed bit contributions to the complex soft symbol value. As illustrated, the memory 30 may be included in a soft symbol value generator 34, which is configured to generate complex soft symbol values corresponding to symbols of interest in a received signal, according to the teachings presented herein.

Figure 2:
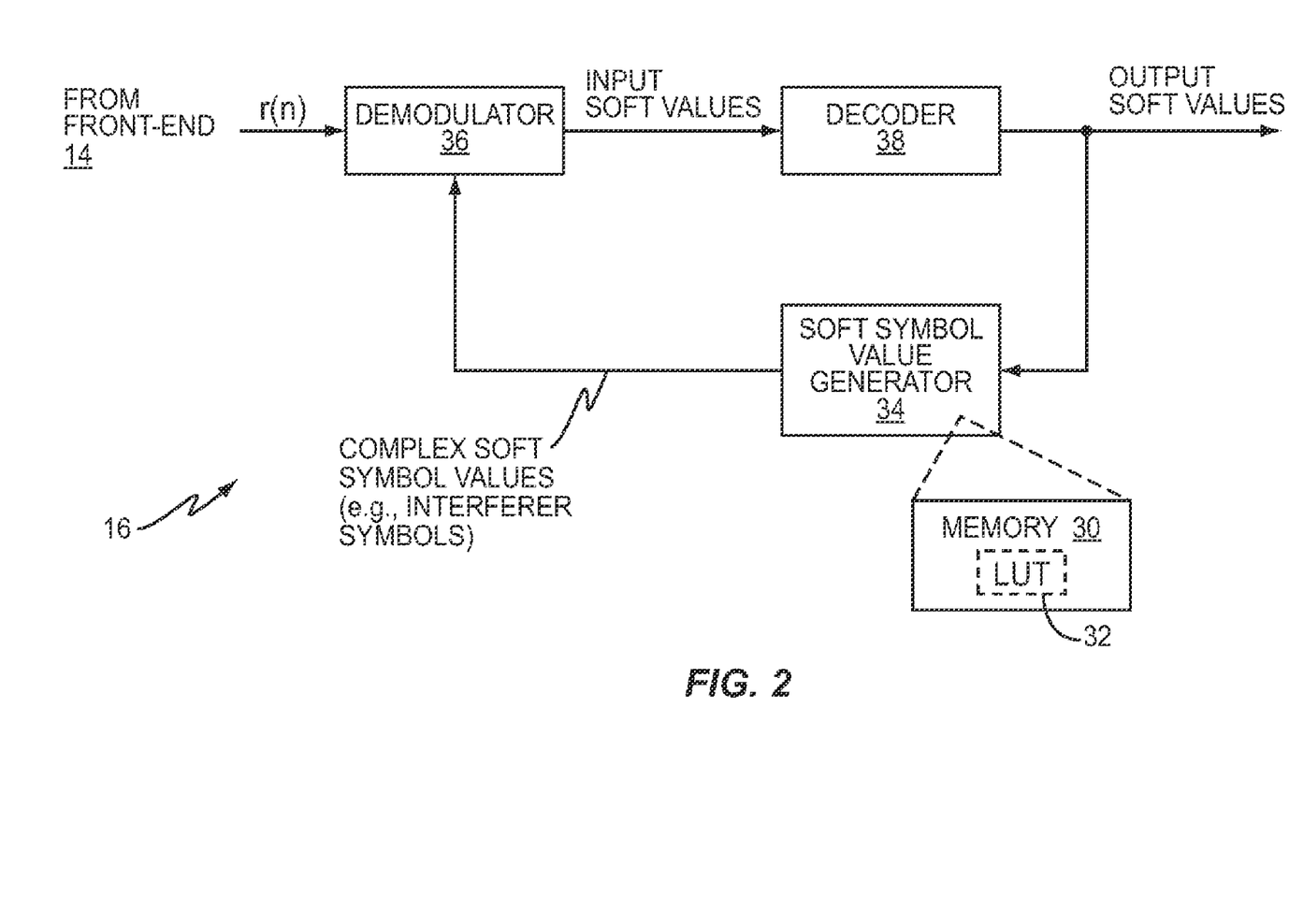
FIG. 2 is a block diagram of one embodiment of equalization and decoding circuitry, such as may be used in the apparatus of FIG. 1.

The soft symbol value generator 34 in one or more embodiments is included in the equalization and decoding circuitry 16, along with a demodulator 36 and a decoder 38. These processing circuits may be implemented in hardware, software, or both. For example, one or more digital signal processors may be specially adapted or otherwise configured as the illustrated circuitry based on the execution of stored computer program instructions. It will also be appreciated that such circuitry may be duplicated, to provide for similar treatment of additional signals of interest, and/or that such circuitry may be implemented within larger integrated processing circuits having the computational capacity to support the functional realization of multiple such circuits within them.

As such, those skilled in the art however will appreciate that some flexibility exists with respect to the implementation of digital processing circuitry and that various configurations may be used to implement the processing functionality that is detailed herein. In that regard, with respect to a given received signal of interest, the equalization and decoding circuitry 16 is configured to generate input bit soft values for the symbol of interest, each input bit soft value being a likelihood estimate for a given bit in the symbol of interest, and calculate the complex soft symbol value for the symbol of interest. That is, the front-end circuitry 14 produces digital samples r(n) from antenna-received signal(s) r(t), and the demodulator 36 produces input bit soft values for symbols of interest detected in the received signal r(n).

The input bit soft values for symbols of interest in the received signal are used by the soft symbol value generator 34 to generate complex soft symbol values for reducing interference in the received signal, e.g., in a soft modulation process implemented by the equalization and decoding circuitry 16. To do so, the soft symbol value generator 34 is configured to determine a first soft symbol value for the real part of (any given) symbol of interest by indexing into the look-up table as a function of the input bit soft values corresponding to the real part, and determine a second soft symbol value for the imaginary part of the symbol of interest by indexing into the look-up table as a function of the input bit soft values corresponding to the imaginary part. The soft symbol value generator 34 is further configured to form the complex soft symbol value for the symbol of interest by combining the first and second soft symbol values.

As noted above, in one or more embodiments, the apparatus 10 is a wireless communication node or other such device configured to receive a communication signal conveying the symbol of interest as one in a plurality of symbols of interest received by the wireless communication node, and wherein the wireless communication node is configured to form complex soft symbol values corresponding to the plurality of symbols of interest. Of course, it is also directly contemplated that the soft modulation invention described herein can be advantageously implemented at the terminal-side of a communication network, i.e., as part of the received signal processing circuitry of a mobile terminal or other UE.

In any case, in at least one embodiment, the look-up table 32 is configured to convert bit soft values into average sign values, for use as soft symbol contribution values, for determining the first and second soft symbol values used to form the complex soft symbol value for the symbol of interest. In particular, in at least one embodiment, the look-up table 32 embodies a function $f(c_{n,k})$, wherein $c_{n,k}$ is a log likelihood ratio given as $$c_{n,k} = \log \frac{P(b_{n,k} = 0)}{P(b_{n,k} = 1)},$$

and $f(c_{n,k}) = P(b_{n,k}=0) - P(b_{n,k}=1)$, or, equivalently, $$f(c_{n,k}) = \frac{\exp(c_{n,k}) - 1}{\exp(c_{n,k}) + 1},$$

and wherein $P(b_{n,k}=0)$ is a numeric value representing the probability that the k-th bit of the n-th symbol of interest is a 0, and $P(b_{n,k}=1)$ is a numeric value representing the probability that the k-th bit of the n-th symbol of interest is a 1.

Further, in at least one embodiment, the apparatus 10 is configured to determine the first and second soft symbol values each by bit-wise translating a real-valued, reduced modulation constellation corresponding to either the real or imaginary part of the symbol of interest, as needed, so that at each translation a different one of the bits in the reduced modulation constellation determines the sign of the constellation. For example, the apparatus 10 carries out said bit-wise translation for each of the real and imaginary parts by being configured to: determine the average sign value of the most significant bit of the real or imaginary part; determine a soft symbol value for a reduced modulation constellation excluding the most significant bit; and translate the soft symbol value for the reduced modulation constellation and multiplying it with the average sign value of the most significant bit, to form the first or second soft symbol value for a modulation constellation that is two times larger than the reduced modulation constellation.

Still further, in at least one embodiment, the apparatus 10 calculates the complex soft symbol value by being configured to use the look-up table to determine the average sign value of each bit in the symbol of interest, and to determine the complex soft symbol value from said average sign values.

Additionally, in at least one embodiment, the apparatus 10 includes a turbo decoder that implements an iterative turbo equalization process—e.g., the decoder 38 is configured as a turbo decoder circuit. In one such embodiment, the apparatus 10 receives a signal conveying one or more symbols of interest, and the apparatus 10 generates complex soft symbol values corresponding to those received symbols of interest, and uses them in a soft modulation process that reduces inter-symbol interference in the received signal.

In at least one such embodiment, the apparatus 10 includes or is associated with a MIMO receiver and it forms a plurality of complex soft symbol values for a plurality of symbols of interest that are received in a Multiple-Input-Multiple-Output (MIMO) signal. In at least one such embodiment, the apparatus 10 is configured to implement a turbo soft interference cancellation process applied to the MIMO signal, and to use the complex soft symbol values in a soft modulation process implemented by the apparatus 10, to reduce inter-stream interference in the received MIMO signal.

Figure 3:
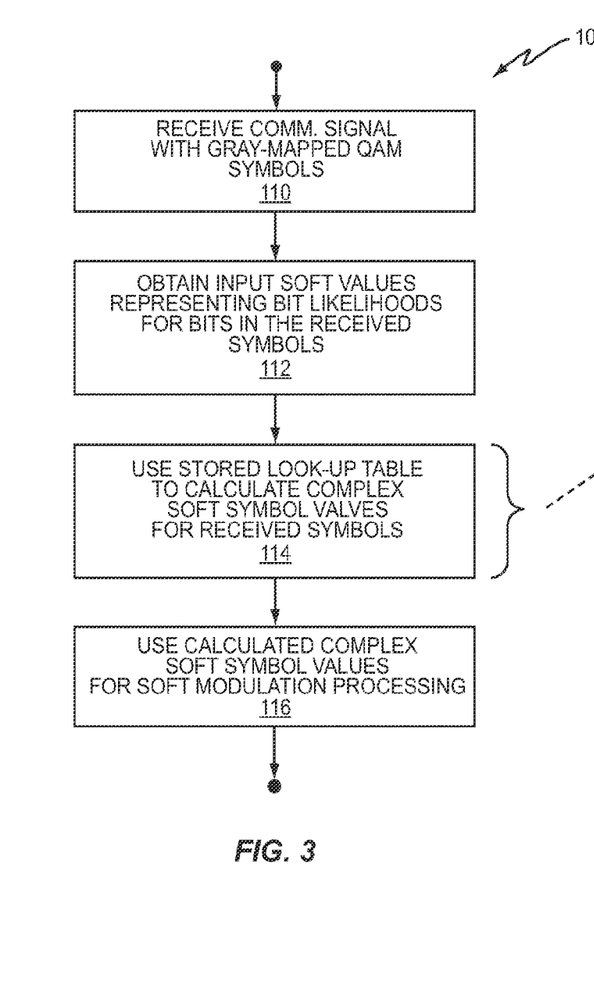
FIGS. 3 and 4 are logic flow diagrams illustrating an embodiment of processing logic that may be implemented, for example, by the apparatus of FIG. 1, for the generation of soft modulation values.

FIG. 3 illustrates a method 100 corresponding to one or more of the above embodiments of complex soft symbol value generation. The illustrated embodiment, which may be implemented by the apparatus 10, begins with receiving a communication signal that includes one or more Gray-mapped QAM symbols of interest (Block 110).

Figure 4:
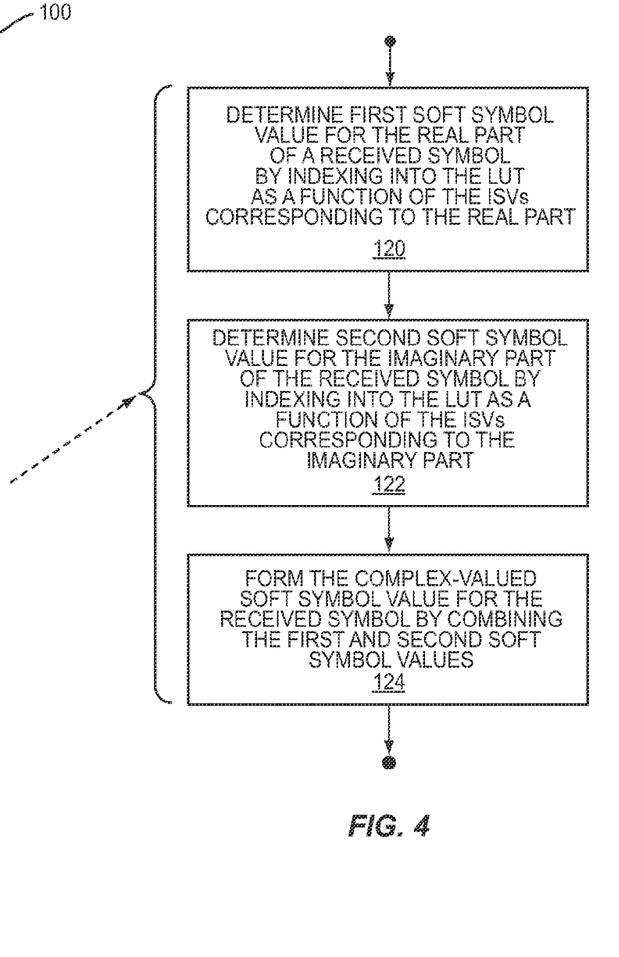

Processing continues with obtaining input soft values representing bit likelihoods for bits in the received symbols of interest (Block 112). Still further, processing continues with an embodiment of the stored look-up table 32 to calculate complex soft symbol values for the received symbols of interest—i.e., the input bit soft values determined for each received symbol of interest are used to index into the look-up table 32, to obtain the particular pre-computed bit contributions to be used in forming the complex soft symbol value (Block 114). The calculated complex soft symbol values are then used for soft modulation processing (Block 116). As for the computationally-efficient and advantageous use of the look-up table 32 in generation of the complex soft symbol values, Blocks 120, 122, and 124 of FIG. 4 illustrate the advantageous processing of real and imaginary parts, for each complex symbol value being formed, as described earlier herein.

To better understand such processing, note that any Gray-mapped QAM constellation can be divided into real and imaginary parts as $$s^i = s^{-i_{re}} + j \cdot s^{-i_{im}}, \quad \text{(Eq. 1)}$$

where $s^{-i_{re}}$ and $s^{-i_{im}}$ are real-valued symbol constellations.

Because the symbol probability P for the n-th symbol of interest equals the product of the bit probabilities for the bits within that symbol, the symbol probability can be expressed as $$P(s_n = s^i) = P(\text{Re}\{s_n\} = s^{i_{re}}) P(\text{Im}\{s_n\} = s^{i_{im}}) \quad \text{(Eq. 2)}$$

or $$P(s_n = s^i) = \left(\prod_{k_{re}=0}^{q/2-1} P(b_{n,2k_{re}} = \tilde{b}_{k_{re}}^{i_{re}})\right)\left(\prod_{k_{im}=0}^{q/2-1} P(b_{n,2k_{im}+1} = \tilde{b}_{k_{im}}^{i_{im}})\right). \quad \text{(Eq. 3)}$$

The regenerated symbol—i.e., the complex soft symbol value for use in soft modulation processing—therefore can be expressed as $$\hat{s}_n = \sum_{i_{re}=0}^{\sqrt{M}-1} \sum_{i_{im}=0}^{\sqrt{M}-1} ((\tilde{s}^{i_{re}} + j\tilde{s}^{i_{im}}) P(\text{Re}\{s_n\} = \tilde{s}^{i_{re}}) P(\text{Im}\{s_n\} = \tilde{s}^{i_{im}})). \quad \text{(Eq. 4)}$$

By noting that $$\sum_{i_{re}=0}^{\sqrt{M}-1} P(\text{Re}\{s_n\} = \tilde{s}^{i_{re}}) = \sum_{i_{im}=0}^{\sqrt{M}-1} P(\text{Im}\{s_n\} = \tilde{s}^{i_{im}}) = 1, \quad \text{(Eq. 5)}$$

the above expression can be simplified as $$\hat{s}_n = \sum_{i_{re}=0}^{\sqrt{M}-1} \tilde{s}^{i_{re}} P(\text{Re}\{s_n\} = \tilde{s}^{i_{re}}) + j \sum_{i_{im}=0}^{\sqrt{M}-1} \tilde{s}^{i_{im}} P(\text{Im}\{s_n\} = \tilde{s}^{i_{im}}). \quad \text{(Eq. 6)}$$

Thus, instead of performing soft modulation over the complex constellation, the apparatus 10 can be configured to implement a method whereby soft modulation is performed over the real and imaginary parts separately and the results are combined. For example, with 16-QAM, instead of having one constellation with 16 points, the apparatus 10 advantageously works with or according to two real-valued constellations with four points.

Figure 5:
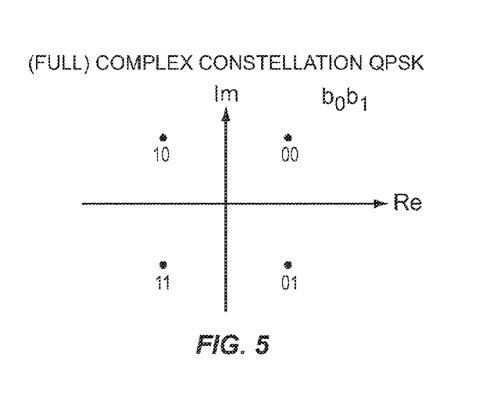
FIG. 5 is an example modulation constellation for Gray-mapped QPSK symbols.

With Quadrature Phase Shift Keying (QPSK) modulation as an example, the modulation order is M=4, with FIG. 5 depicting an example Gray-mapped QPSK modulation constellation. The symbol constellation in each of the real and imaginary parts is $$\tilde{s}^i = \begin{cases} \dfrac{1}{\sqrt{2}}, & i = 0 \\ -\dfrac{1}{\sqrt{2}}, & i = 1 \end{cases}, \quad \text{(Eq. 7)}$$

with bit-to-symbol mapping of $$\begin{cases} \tilde{b}_0^0 = 0 \\ \tilde{b}_0^1 = 1 \end{cases}. \quad \text{(Eq. 8)}$$

Figure 6:
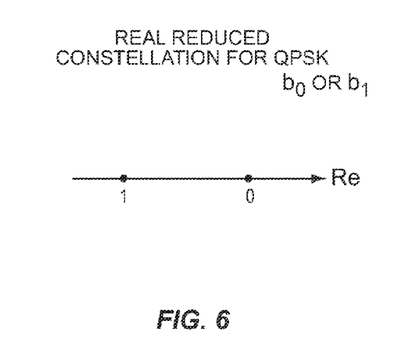
FIG. 6 is a diagram of a reduced-size, real-valued modulation constellation associated with advantageous processing of real and imaginary parts of Gray-mapped QPSK symbols, for soft modulation value generation.

FIG. 6 illustrates the reduced (real-valued) modulation constellation for either the real or imaginary parts of a Gray-mapped QPSK symbol. With this approach, soft modulation processing in the apparatus 10 can be based on expressing the soft modulation for a given Gray-mapped QPSK symbol of interest as $$\hat{s}_n = \sum_{i_{re}=0}^{1} \tilde{s}^{i_{re}} P(b_{n,0} = \tilde{b}_0^{i_{re}}) + j \sum_{i_{im}=0}^{1} \tilde{s}^{i_{im}} P(b_{n,1} = \tilde{b}_0^{i_{im}}) = \dfrac{f(c_{n,0}) + j \cdot f(c_{n,1})}{\sqrt{2}}, \quad \text{(Eq. 9)}$$

which expression introduces the log-likelihood ratios $$c_{n,k} = \log \dfrac{P(b_{n,k} = 0)}{P(b_{n,k} = 1)} \quad \text{(Eq. 10)}$$

and the function $$f(c_{n,k}) = P(b_{n,k} = 0) - P(b_{n,k} = 1) = \dfrac{\exp(c_{n,k}) - 1}{\exp(c_{n,k}) + 1}. \quad \text{(Eq. 11)}$$

The function $f(c_{n,k})$ can be implemented efficiently using table lookup—i.e., the entries in the look-up table 32 can be based on the function of (Eq. 11). For example, a bit log-likelihood ratio $c_{n,k}$ arrives at the input of soft symbol value generator 34. This input soft value is used to index LUT 32 stored in memory 30. An example of LUT 32 is given below.

−8.0000 −0.9993
−7.5000 −0.9989
−7.0000 −0.9982
−6.5000 −0.9970
−6.0000 −0.9951
−5.5000 −0.9919
−5.0000 −0.9866
−4.5000 −0.9780
−4.0000 −0.9640
−3.5000 −0.9414
−3.0000 −0.9051
−2.5000 −0.8483
−2.0000 −0.7616
−1.5000 −0.6351
−1.0000 −0.4621
−0.5000 −0.2449
0 0
0.5000 0.2449
1.0000 0.4621
1.5000 0.6351
2.0000 0.7616
2.5000 0.8483
3.0000 0.9051
3.5000 0.9414
4.0000 0.9640

4.5000 0.9780
5.0000 0.9866
5.5000 0.9919
6.0000 0.9951
6.5000 0.9970
7.0000 0.9982
7.5000 0.9989
8.0000 0.9993

Note that the first column is address (or $c_{n,k}$) and the second column is $f(c_{n,k})$. The values in the second column are pre-computed using Eq. (11). One can further use the symmetry property of $f(c_{n,k})$, i.e. $f(c_{n,k})=\text{sign}(c_{n,k})f(|c_{n,k}|)$, to reduce the size of LUT 32. In such cases, only the entries with positive $c_{n,k}$ values are stored in LUT 32.

Thus, the complete soft modulation for the Gray-mapped QPSK constellation can be implemented by the apparatus 10 using only two table lookups and one scaling operation. As a further step, the apparatus 10 may be configured to incorporate the scaling into the look-up table values, thereby further reducing the complexity simply to two table lookups.

Figure 7:
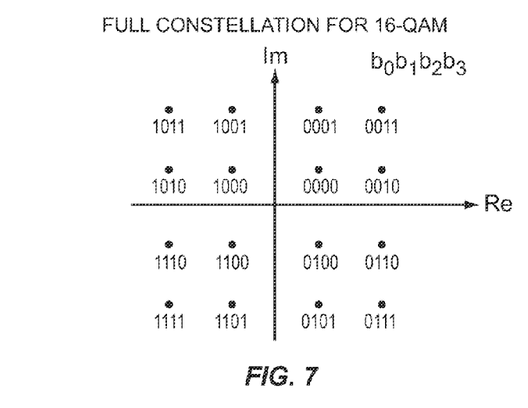
FIG. 7 is an example modulation constellation for Gray-mapped 16QAM symbols.

For 16-QAM, the modulation order is sixteen, i.e., M=16. FIG. 7 depicts an example Gray-mapped 16-QAM constellation. The symbol constellation in each of the real and imaginary parts is $$\tilde{s}^i = \begin{cases} \frac{1}{\sqrt{10}}, & i=0 \\ \frac{3}{\sqrt{10}}, & i=1 \\ -\frac{1}{\sqrt{10}}, & i=2 \\ -\frac{3}{\sqrt{10}}, & i=3 \end{cases} \quad \text{(Eq. 12)}$$

with bit-to-symbol mapping of $$\begin{cases} \tilde{b}_0^0 = 0 \\ \tilde{b}_0^1 = 0 \\ \tilde{b}_0^2 = 1 \\ \tilde{b}_0^3 = 1 \end{cases} \quad \text{(Eq. 13)}$$

and $$\begin{cases} \tilde{b}_1^0 = 0 \\ \tilde{b}_1^1 = 1 \\ \tilde{b}_1^2 = 0 \\ \tilde{b}_1^3 = 1 \end{cases} \quad \text{(Eq. 14)}$$

Correspondingly, the complex soft symbol value for the n-th symbol can be expressed as $$\hat{s}_n = \sum_{i_{re}=0}^{3} \tilde{s}^{i_{re}} P(b_{n,0} = \tilde{b}_0^{i_{re}}) P(b_{n,2} = \tilde{b}_1^{i_{re}}) + \quad \text{(Eq. 15)}$$
$$j \sum_{i_{im}=0}^{3} \tilde{s}^{i_{im}} P(b_{n,1} = \tilde{b}_0^{i_{im}}) P(b_{n,3} = \tilde{b}_1^{i_{im}}).$$

However, as an advantageous exploitation of the Gray mapping used in the modulation constellation, in each of the real and imaginary parts the first bit only affects the sign of the symbol value. Thus, the soft modulation for the real part may be expressed as $$\text{Re}\{\hat{s}_n\} = f(c_{n,0}) \sum_{i_{re}=0}^{1} \tilde{s}^{i_{re}} P(b_{n,2} = \tilde{b}_1^{i_{re}}), \quad \text{(Eq. 16)}$$

where the definition of $f(c_{n,k})$ is as given earlier in (Eq. 11). The remaining positive half of the symbol constellation is the same as the real part of the QPSK constellation in the previous section, plus a constant value and with different scaling. Thus, using the corresponding simplification gives for the real part $$\text{Re}\{\hat{s}_n\} = \frac{f(c_{n,0})(2 - f(c_{n,2}))}{\sqrt{10}}. \quad \text{(Eq. 17)}$$

The same processing and expressions may be used for the imaginary part, $\text{Im}\{\hat{s}_n\}$. Thus, considering the first soft symbol value as obtained for the real part according to (Eq. 17), and determining a second soft symbol value for the imaginary part via like processing, the apparatus 10 can express the complex soft symbol value (soft modulation value) for any given Gray-mapped 16QAM symbol of interest as $$\hat{s}_n = \frac{f(c_{n,0})(2 - f(c_{n,2}))}{\sqrt{10}} + j\frac{f(c_{n,1})(2 - f(c_{n,3}))}{\sqrt{10}}. \quad \text{(Eq. 18)}$$

Thus, the complete soft modulation for the Gray-mapped 16-QAM constellation has a complexity of four table lookups and two multiplications plus a few addition and scaling operations. Similar to QPSK above, by redefining the table lookups the addition and scaling operations can be omitted as well.

Figure 8:
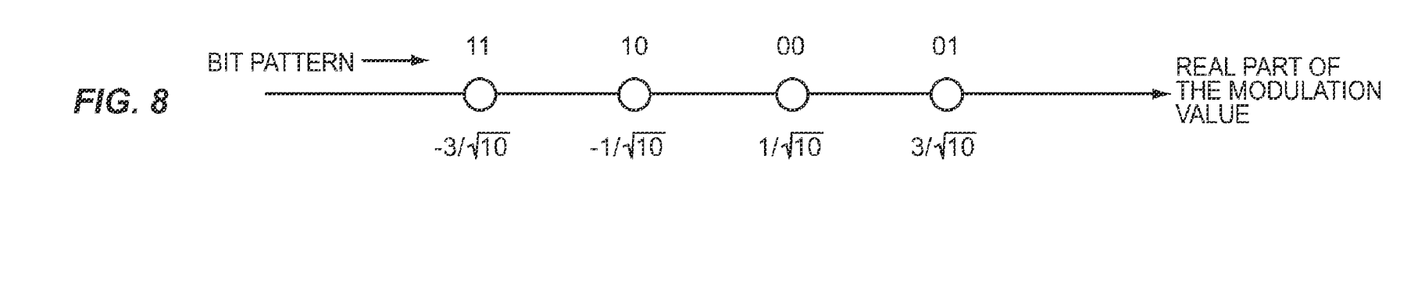
FIG. 8 is a diagram of a reduced-size, real-valued modulation constellation associated with advantageous processing of real and imaginary parts of Gray-mapped 16QAM symbols, for soft modulation value generation.

To better appreciate these simplifications, FIG. 7 illustrates that the first and third bits ($b_0$, $b_2$) determine the real part of any given four-bit, Gray-mapped 16QAM symbol, while the second and Nurth bits ($b_1$, $b_3$) determine the imaginary part. Correspondingly, FIG. 8 illustrates (for either the real or imaginary parts) that the first bit in the bit pair determines the sign and the second bit determines the magnitude. Thus, the contribution of the first bit is the average sign value.

Figure 9:
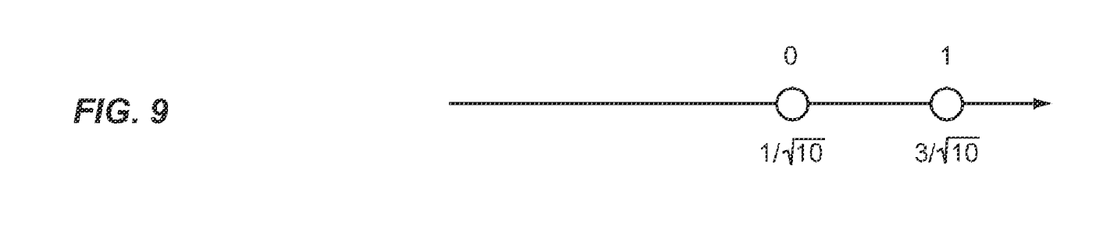
FIG. 9 is a diagram illustrating the magnitude-determining function of a given bit position, for the reduced-size constellation of FIG. 8.
Figure 10:
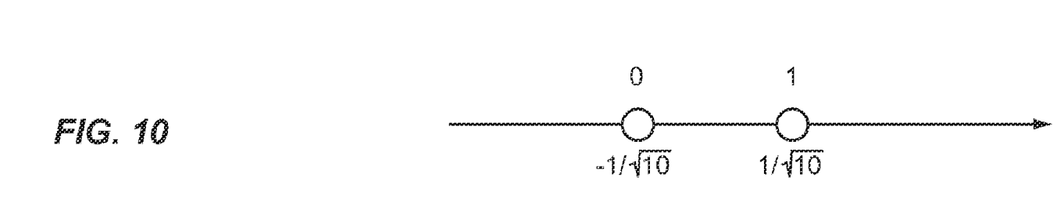
FIG. 10 is a diagram illustrating the constellation-shifting/translating that can be used to make each bit position in the reduced-size constellation a sign bit, for advantageous determination of that bit position's contribution to the soft modulation value as function of average sign values.

Now with reference to FIG. 9 and focus on the second bit of the bit pattern shown in FIG. 8, one sees that a bit value of "0" means a symbol magnitude of "$1/\sqrt{10}$" and a bit value of "1" means a symbol magnitude of "$3/\sqrt{10}$". Further, FIG. 10 illustrates the same constellation shifted by "$-2/\sqrt{10}$", and one sees that the second bit now simply defines the sign—i.e., the magnitude is "$1/\sqrt{10}$" for both bit values 0 and 1, but the sign is "−" for bit value 0 and "+" for bit value 1. The same shifting/translating can be used for these reduced-size modulation constellations, such that each bit position functions as the sign value determiner.

As another example, for the case of Gray-mapped 64-QAM, M=64 and the symbol constellation in each of the real and imaginary parts is $$\tilde{s}^i = \begin{cases} \frac{3}{\sqrt{42}}, & i=0 \\ \frac{1}{\sqrt{42}}, & i=1 \\ \frac{5}{\sqrt{42}}, & i=2 \\ \frac{7}{\sqrt{42}}, & i=3 \\ \frac{-3}{\sqrt{42}}, & i=4 \\ \frac{-1}{\sqrt{42}}, & i=5 \\ \frac{-5}{\sqrt{42}}, & i=6 \\ \frac{-7}{\sqrt{42}}, & i=7 \end{cases} \quad \text{(Eq. 19)}$$

with bit-to-symbol mappings of $$\begin{cases} \tilde{b}_0^0 = 0 \\ \tilde{b}_0^1 = 0 \\ \tilde{b}_0^2 = 0 \\ \tilde{b}_0^3 = 0 \\ \tilde{b}_0^4 = 1 \\ \tilde{b}_0^5 = 1 \\ \tilde{b}_0^6 = 1 \\ \tilde{b}_0^7 = 1 \end{cases}, \quad \text{(Eq. 20)}$$

$$\begin{cases} \tilde{b}_1^0 = 0 \\ \tilde{b}_1^1 = 0 \\ \tilde{b}_1^2 = 1 \\ \tilde{b}_1^3 = 1 \\ \tilde{b}_1^4 = 0 \\ \tilde{b}_1^5 = 0 \\ \tilde{b}_1^6 = 1 \\ \tilde{b}_1^7 = 1 \end{cases}, \quad \text{(Eq. 21)}$$

and $$\begin{cases} \tilde{b}_2^0 = 0 \\ \tilde{b}_2^1 = 1 \\ \tilde{b}_2^2 = 0 \\ \tilde{b}_2^3 = 1 \\ \tilde{b}_2^4 = 0 \\ \tilde{b}_2^5 = 1 \\ \tilde{b}_2^6 = 0 \\ \tilde{b}_2^7 = 1 \end{cases}. \quad \text{(Eq. 22)}$$

Like the 16-QAM case, utilizing the Gray mapping basis, in each of the real and imaginary parts the first bit only affects the sign of the symbol value. Thus, the soft modulation for the real part can be expressed as $$\operatorname{Re}\{\hat{s}_n\} = f(c_{n,0}) \sum_{i_{re}=0}^{3} \tilde{s}^{i_{re}} P(b_{n,2} = \tilde{b}_1^{i_{re}}) P(b_{n,4} = \tilde{b}_2^{i_{re}}). \quad \text{(Eq. 23)}$$

Defining $$x^i = \tilde{s}^{i_{re}} - \frac{4}{\sqrt{42}},$$

$i_{re}$=0, 1, 2, 3, then $$x^i = \begin{cases} \frac{-1}{\sqrt{42}}, & i=0 \\ \frac{-3}{\sqrt{42}}, & i=1 \\ \frac{1}{\sqrt{42}}, & i=2 \\ \frac{3}{\sqrt{42}}, & i=3 \end{cases}. \quad \text{(Eq. 24)}$$

Therefore, $b_1^{-i}$ affects the sign of $x^i$. Thus, $$\sum_{i_{re}=0}^{3} x^i P(b_{n,2} = \tilde{b}_1^{i_{re}}) P(b_{n,4} = \tilde{b}_2^{i_{re}}) = -f(c_{n,2}) \sum_{i_{re}=0}^{1} x^i P(b_{n,4} = \tilde{b}_2^{i_{re}}). \quad \text{(Eq. 25)}$$

Furthermore, defining $$y^i = x^i - \frac{2}{\sqrt{42}}, \, i=0, 1, \text{ then } y^0 = \frac{-1}{\sqrt{42}} \text{ and } y^1 = \frac{1}{\sqrt{42}}.$$

It follows that $$\sum_{i_{re}=0}^{1} y^i P(b_{n,4} = \tilde{b}_2^{i_{re}}) = \frac{-f(c_{n,4})}{\sqrt{42}}. \quad \text{(Eq. 26)}$$

Effectively, then, the above processing can be understood as shifting (translating) the subset of the modulation constellation appropriately, to let each of the bits simply determine the sign of the translated constellation. In this manner, the apparatus 10 can reuse the same lookup table $f(c)$. For example, in one embodiment, the steps of determining the first and second soft symbol values—corresponding to a given symbol of interest—each comprises bit-wise translating a real-valued, reduced modulation constellation corresponding to either the real or imaginary part of the symbol of interest, as needed, so that at each translation a different one of the bits in the reduced modulation constellation determines the sign of the constellation.

In a particular implementation, each translation step comprises: determining the average sign value of the most significant bit; determining the soft symbol value for a reduced constellation excluding the most significant bit; and translating the soft symbol value for the reduced constellation and multiplying with the average sign value of the most significant bit to form the soft symbol value for a constellation of twice the size including the most significant bit.

Broadly, the teachings herein can be understood as advantageously providing an approach to soft symbol generation that bit-wise breaks down the larger modulation constellation associated with the symbol for which a soft modulation value is being generated into smaller constellations. Then, depending on the desired implementation for the reduced-complexity soft modulation calculations, either one look-up table 32 can be used for all bits or one custom table 32-*x* can be used per bit position. Both variants would work equally well.

In any case, staying with the 64-QAM example and using the above partial summations, one has $$\text{Re}\{\hat{s}_n\} = f(c_{n,0})\bar{x} = f(c_{n,0})\left[\frac{4}{\sqrt{42}} - f(c_{n,2})\left[\frac{2}{\sqrt{42}} - \frac{f(c_{n,4})}{\sqrt{42}}\right]\right] = \quad (\text{Eq. 27})$$

$$\frac{1}{\sqrt{42}}f(c_{n,0})(4 - f(c_{n,2})(2 - f(c_{n,4}))).$$

By applying the same simplifications to the imaginary part, the apparatus 10 can form the complex soft symbol value—the soft modulation value—for a given received symbol of interest as $$\hat{s}_n = \frac{f(c_{n,0})(4 - f(c_{n,2})(2 - f(c_{n,4})))}{\sqrt{42}} + \quad (\text{Eq. 28})$$
$$j\frac{f(c_{n,1})(4 - f(c_{n,3})(2 - f(c_{n,5})))}{\sqrt{42}}.$$

Those skilled in the art will appreciate that the same method can be applied to higher-order Gray-mapped QAM constellations. In all such cases, but particularly so as the modulation order increases, the present invention provides a significant reduction of the complexity in soft modulation, making a Turbo equalization receiver feasible to implement, for example. As a further advantage, the computational advantages do not rely on simplifying approximations and thus retain full receiver performance.

It will also be appreciated that the signal processing circuitry described herein, and directly implied by the disclosed method of received signal processing, functions as a particular machine that is specially adapted to implement the functions disclosed herein, or variations of them, as will occur to those of ordinary skill in the art. It will also be appreciated that the disclosed method is a process that transforms certain signal measurements or associated estimations into soft modulation values that are directly useful, for example, in reducing interference components in a received communication signal.

Of course, the above examples are not intended to limit the present invention. Instead, the present invention is limited only by the patent claims and their legal equivalents.

What is claimed is:

1. A method of decoding a symbol of interest received by a wireless transceiver, the method comprising generating a complex soft symbol value for the symbol of interest, the symbol of interest having a Gray-mapped QAM format, the complex soft symbol value having a real part and an imaginary part, said method comprising:
   storing a look-up table of pre-computed bit contributions to the complex soft symbol value at a machine-readable memory of the wireless transceiver;
   generating input bit soft values for the symbol of interest, each input bit soft value being a likelihood estimate for a given bit in the symbol of interest; and
   calculating the complex soft symbol value for the symbol of interest by:
   determining a first soft symbol value for the real part of the symbol of interest by indexing into the look-up table as a function of the input bit soft values corresponding to the real part, and determining a second soft symbol value for the imaginary part of the symbol of interest by indexing into the look-up table as a function of the input bit soft values corresponding to the imaginary part; and
   forming the complex soft symbol value for the symbol of interest by combining the first and second soft symbol values.

2. The method of claim 1, wherein said method is performed in a wireless communication node for the symbol of interest, as one in a plurality of received symbols of interest conveyed by a communication signal received by the wireless communication node.

3. The method of claim 1, wherein the look-up table is configured to convert bit soft values into average sign values, for use as soft symbol contribution values, for determining the first and second soft symbol values used to form the complex soft symbol value for the symbol of interest.

4. The method of claim 3, wherein the look-up table embodies a function $f(c_{n,k})$, wherein $c_{n,k}$ is a log likelihood ratio given as $$c_{n,k} = \log\frac{P(b_{n,k} = 0)}{P(b_{n,k} = 1)},$$

and $f(c_{n,k})=P(b_{n,k}=0)-P(b_{n,k}=1)$, or, equivalently, $$f(c_{n,k}) = \frac{\exp(c_{n,k}) - 1}{\exp(c_{n,k}) + 1},$$

and
   wherein $P(b_{n,k}=0)$ is a numeric value representing the probability that the k-th bit of the n-th symbol of interest is a 0, and $P(b_{n,k}=1)$ is a numeric value representing the probability that the k-th bit of the n-th symbol of interest is a 1.

5. The method of claim 1, wherein said steps of determining the first and second soft symbol values each comprises bit-wise translating a real-valued, reduced modulation constellation corresponding to either the real or imaginary part of the symbol of interest, as needed, so that at each translation a different one of the bits in the reduced modulation constellation determines a sign of the constellation.

6. The method of claim 5, wherein said translating for each of the real and imaginary parts comprises:
   determining the average sign value of the most significant bit of the real or imaginary part;
   determining a soft symbol value for a reduced modulation constellation excluding the most significant bit; and
   translating the soft symbol value for the reduced modulation constellation and multiplying it with the average sign value of the most significant bit, to form the first or second soft symbol value for a modulation constellation that is two times larger than the reduced modulation constellation.

7. The method of claim 1, wherein said step of calculating the complex soft symbol value comprises using the look-up table to determine an average sign value of each bit in the symbol of interest, in said steps of determining the first and second soft symbol values, and determining the complex soft symbol value from said average sign values.

8. The method of claim 1, further comprising performing said method as part of an iterative turbo equalization process, wherein the complex soft symbol value corresponds to a received symbol conveyed in a received signal, and is used in a soft modulation process that reduces inter-symbol interference in the received signal.

9. The method of claim 1, wherein the complex soft symbol value is one in a plurality of complex soft symbol values formed for a plurality of symbols of interest that are received in a Multiple-Input-Multiple-Output (MIMO) signal by a MIMO receiver, and wherein the method further comprises performing said method as part of a turbo soft interference cancellation process applied to the MIMO signal, wherein said complex soft symbol values are used in a soft modulation process that reduces inter-stream interference in the received MIMO signal.

10. An apparatus configured to generate a complex soft symbol value for a symbol of interest having a Gray-mapped QAM format, the complex soft symbol value having a real part and an imaginary part, said apparatus comprising:
memory configured to store a look-up table of pre-computed bit contributions to the complex soft symbol value; and
equalization and decoding circuitry configured to:
generate input bit soft values for the symbol of interest, each input bit soft value being a likelihood estimate for a given bit in the symbol of interest; and
calculate the complex soft symbol value for the symbol of interest by being configured to:
determine a first soft symbol value for the real part of the symbol of interest by indexing into the look-up table as a function of the input bit soft values corresponding to the real part, and determine a second soft symbol value for the imaginary part of the symbol of interest by indexing into the look-up table as a function of the input bit soft values corresponding to the imaginary part; and
form the complex soft symbol value for the symbol of interest by combining the first and second soft symbol values.

11. The apparatus of claim 10, wherein said apparatus is a wireless communication node configured to receive a communication signal conveying the symbol of interest as one in a plurality of symbols of interest received by the wireless communication node, and wherein the wireless communication node is configured to form complex soft symbol values corresponding to the plurality of symbols of interest.

12. The apparatus of claim 10, wherein the look-up table is configured to convert bit soft values into average sign values, for use as soft symbol contribution values, for determining the first and second soft symbol values used to form the complex soft symbol value for the symbol of interest.

13. The apparatus of claim 12, wherein the look-up table embodies a function $f(c_{n,k})$, wherein $c_{n,k}$ is a log likelihood ratio given as $$c_{n,k} = \log \frac{P(b_{n,k} = 0)}{P(b_{n,k} = 1)},$$

and $f(c_{n,k}) = P(b_{n,k}=0) - P(b_{n,k}=1)$, or, equivalently, $$f(c_{n,k}) = \frac{\exp(c_{n,k}) - 1}{\exp(c_{n,k}) + 1},$$

and
wherein $P(b_{n,k}=0)$ is a numeric value representing the probability that the k-th bit of the n-th symbol of interest is a 0, and $P(b_{n,k}=1)$ is a numeric value representing the probability that the k-th bit of the n-th symbol of interest is a 1.

14. The apparatus of claim 10, wherein said apparatus is configured to determine the first and second soft symbol values each by bit-wise translating a real-valued, reduced modulation constellation corresponding to either the real or imaginary part of the symbol of interest, as needed, so that at each translation a different one of the bits in the reduced modulation constellation determines a sign of the constellation.

15. The apparatus of claim 14, wherein the apparatus carries out said bit-wise translation for each of the real and imaginary parts by being configured to:
determine a average sign value of the most significant bit of the real or imaginary part;
determine a soft symbol value for a reduced modulation constellation excluding the most significant bit; and
translate the soft symbol value for the reduced modulation constellation and multiplying it with the average sign value of the most significant bit, to form the first or second soft symbol value for a modulation constellation that is two times larger than the reduced modulation constellation.

16. The apparatus of claim 15, wherein the apparatus calculates the complex soft symbol value by being configured to use the look-up table to determine the average sign value of each bit in the symbol of interest, and to determine the complex soft symbol value from said average sign values.

17. The apparatus of claim 10, wherein the apparatus includes a turbo decoder that implements an iterative turbo equalization process, the complex soft symbol value corresponds to a received symbol conveyed in a received signal, and the apparatus is configured to use the complex soft symbol value in a soft modulation process that reduces inter-symbol interference in the received signal.

18. The apparatus of claim 10, wherein the complex soft symbol value is one in a plurality of complex soft symbol values formed for a plurality of symbols of interest that are received in a Multiple-Input-Multiple-Output (MIMO) signal by a MIMO receiver included in or associated with the apparatus, and wherein the apparatus is configured to implement a turbo soft interference cancellation process applied to the MIMO signal, and to use the complex soft symbol values in a soft modulation process implemented by the apparatus, to reduce inter-stream interference in the received MIMO signal.

* * * * *

UNITED STATES PATENT AND TRADEMARK OFFICE
CERTIFICATE OF CORRECTION

PATENT NO. : 8,340,202 B2
APPLICATION NO. : 12/722169
DATED : December 25, 2012
INVENTOR(S) : Huss et al.

It is certified that error appears in the above-identified patent and that said Letters Patent is hereby corrected as shown below:

On Title Page 2, in Item (56), under "U.S. PATENT DOCUMENTS", in Column 1, Line 3, delete "Geaef" and insert -- Graef --, therefor.

In the Specifications:

In Column 4, Line 9, delete "ASICS," and insert -- ASICs, --, therefor.

In Column 10, Line 47, delete "Nurth" and insert -- Fourth --, therefor.

Signed and Sealed this
Twenty-eighth Day of May, 2013

Teresa Stanek Rea
*Acting Director of the United States Patent and Trademark Office*